Dec. 18, 1956     W. H. BIXBY     2,774,930
REGULATED RECTIFYING APPARATUS
Filed July 18, 1955     5 Sheets-Sheet 1

INVENTOR
W. H. BIXBY
BY
ATTORNEY

Dec. 18, 1956 W. H. BIXBY 2,774,930
REGULATED RECTIFYING APPARATUS
Filed July 18, 1955 5 Sheets-Sheet 2
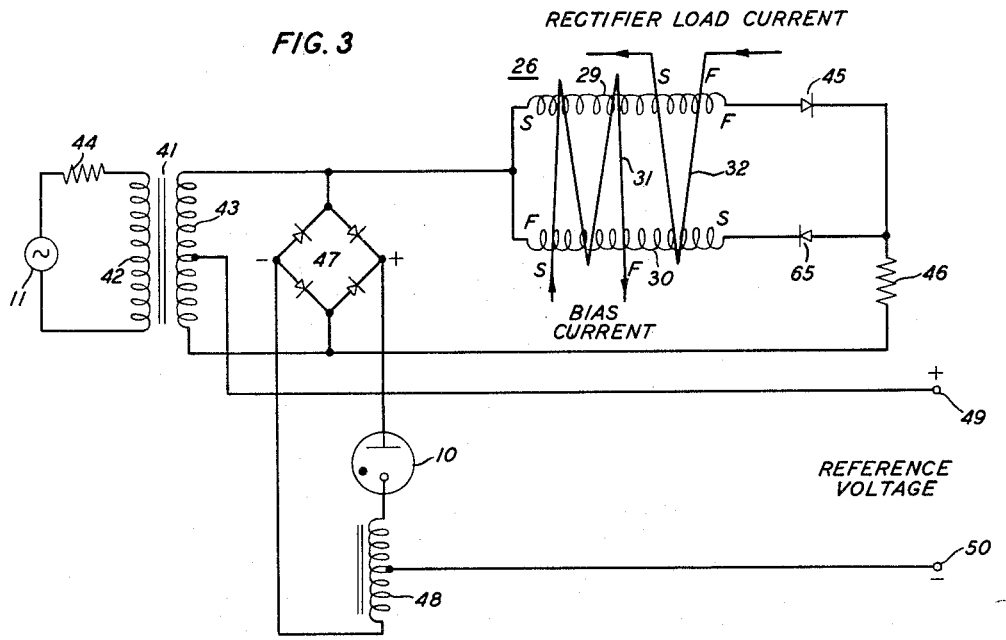
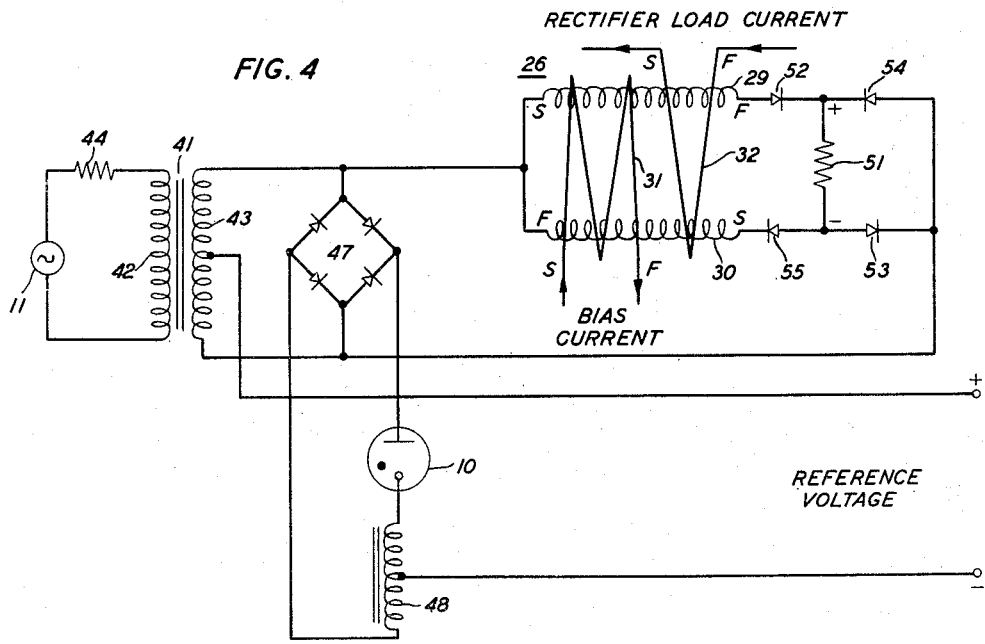
INVENTOR
W. H. BIXBY
BY
ATTORNEY Dec. 18, 1956 W. H. BIXBY 2,774,930
REGULATED RECTIFYING APPARATUS
Filed July 18, 1955 5 Sheets-Sheet 3

INVENTOR
W. H. BIXBY
BY
ATTORNEY

Dec. 18, 1956  W. H. BIXBY  2,774,930
REGULATED RECTIFYING APPARATUS
Filed July 18, 1955  5 Sheets-Sheet 5

INVENTOR
W. H. BIXBY
BY
*G. F. Heuerman*
ATTORNEY

United States Patent Office 2,774,930
Patented Dec. 18, 1956

2,774,930

REGULATED RECTIFYING APPARATUS

William H. Bixby, Detroit, Mich., assignor to Donald R. Middleton and Stanley M. Hanley, doing business under the name and style of Power Equipment Company, Detroit, Mich., a copartnership Application July 18, 1955, Serial No. 522,634

13 Claims. (Cl. 321—18)

This invention relates to voltage regulation and particularly to regulated rectifying apparatus which is protected against overloading.

An object of the invention is to provide improved apparatus for limiting the current supplied to a load to a certain maximum amplitude and for minimizing load voltage changes when the load current is within a normal operating range below said maximum amplitude.

It is common practice to provide a regulator for controlling the current supplied from a supply source to a load to minimize load voltage changes. To accomplish this there may be impressed upon the regulator a control voltage equal to the difference of a voltage proportional to the load voltage and a substantially constant reference voltage. A circuit comprising a diode such as a cold cathode, gas filled space current device or a p–n junction device may be used for setting up the constant reference voltage. The voltage across such a device remains substantially constant when the current flowing through it has an amplitude within a normal operating range. It is also frequently desirable to cause an abrupt decrease of load voltage if the load current should increase to an amplitude above the normal range of load current.

In United States Patent 2,511,219, granted to R. J. Pogorzelski, June 13, 1950, and assigned to the assignee of the present application, there is impressed upon a regulator, during normal operation, a control voltage equal to the difference of a voltage proportional to the load voltage and a portion of the voltage across a constant voltage device. When the load current becomes excessive, there is added to the control voltage an additional voltage component in opposition to the voltage across the constant voltage device for limiting the increase of load current.

In a specific embodiment of the present invention, herein shown and described for the purpose of illustration, there is provided a regulator for controlling the current supplied to a load to maintain the load voltage substantially constant over a normal operating range of load current. There is impressed upon the regulator a control voltage equal to the difference of a voltage proportional to the load voltage and a substantially constant reference voltage. The constant reference voltage is set up by a circuit comprising a constant voltage device or diode to which is supplied, under normal operating conditions, current within an amplitude range such that the reference voltage remains substantially constant irrespective of changes of load current. Means are provided for reducing the current supplied to the constant voltage device to cause the reference voltage to decrease in response to an increase of load current above the normal operating range, thereby reducing the load voltage and limiting the increase of load current.

The invention will now be described in greater detail with reference to the accompanying drawing in which:

Figs. 1, 2, 3, 4, 8, 9 and 10 are schematic views of current supply circuits embodying the invention;

Figure 1:
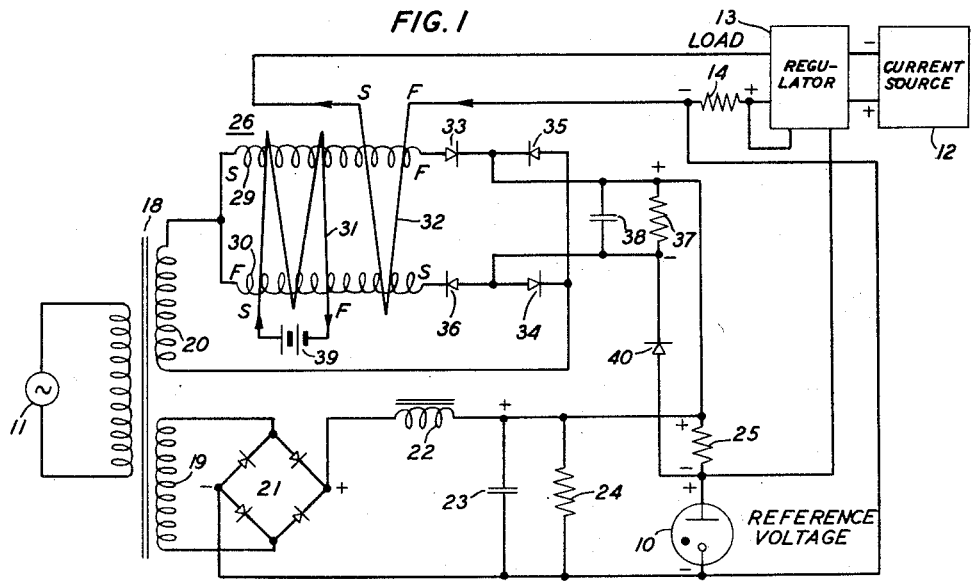
Figure 6:
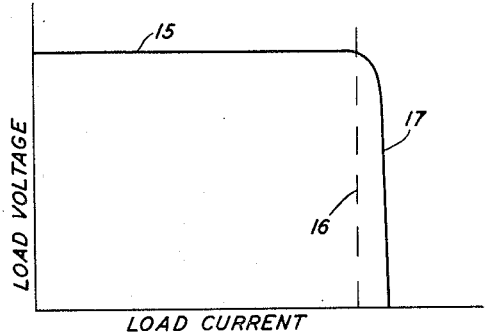
Figs. 6 and 7 are diagrams to which reference will be made in explaining the operation of the invention.

Referring now to the drawing, there is shown in Fig. 1, a cold cathode gas filled constant voltage tube 10 and a circuit for supplying unidirectional current from an alternating-current supply source 11 to the tube 10. There is also shown a current supply source 12 for supplying direct current through a regulator 13 to a load 14 which may vary. As depicted by the curve 15 of Fig. 6, it is desired to maintain the voltage across the load substantially constant over an operating range of load current including a maximum value of load current indicated by the dash line 16. When the load current exceeds the maximum amplitude of the normal operating range, it is desired that the load voltage should decrease abruptly to limit any further increase of load current, as indicated by the drooping portion 17 of curve 15. A relationship between load current and load voltage of the type shown in Fig. 6 is obtained by impressing upon the regulator 13 a control voltage equal to the difference of the load voltage, or a portion thereof, and the reference voltage across the tube 10, or a portion of said reference voltage.

The energizing circuit for tube 10 comprises a transformer 18 having a primary winding connected to the alternating-current supply source 11 and two secondary windings 19 and 20. The secondary winding 19 is connected to the input terminals of a bridge rectifier 21. A ripple filter comprising a series inductor 22 and a shunt condenser 23 is connected to the output terminals of rectifier 21. A bleeder resistor 24 is connected across the condenser 23 to prevent an appreciable rise of voltage across condenser 23 when the current supplied to tube 10 is decreased to zero, as will be described. The energizing circuit for tube 10 may be traced from the positive terminal of rectifier 21 through inductor 22 and through a resistor 25 to the anode of tube 10 and from the cathode of tube 10 to the negative terminal of rectifier 21.

Figure 5:
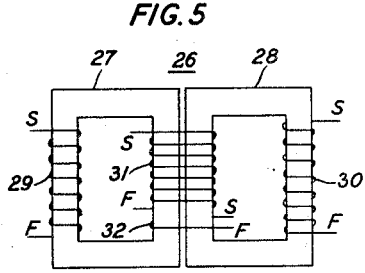
Fig. 5 is a schematic view of a saturable reactor which may be used in the current supply circuits.

There is provided a saturable inductance device 26 which is shown in greater detail in Fig. 5. It preferably comprises cores 27 and 28 of grain aligned, hydrogen annealed, iron-nickel alloy having a substantially rectangular hysteresis loop. Equal gate or impedance windings 29 and 30 are wound on the cores 27 and 28, respectively. A bias winding 31 and a control winding 32 are wound on both cores as shown in Fig. 5. In Fig. 5, as well as in the circuit diagrams of Figs. 1, 2, 3, 4, 8, 9 and 10, one end of each winding is identified by the letter S for "start" and the other end by the letter F for "finish." When the direction of the current flow through the windings, respectively, is known, the direction of the magnetomotive force set up by the current flowing through each winding can be determined.

In the circuit of Fig. 1, there are also provided a rectifier comprising rectifying elements 33, 34, 35 and 36, a resistor 37 shunted by a condenser 38 and a direct voltage source, shown as a battery 39 for convenience, for supplying current to the bias winding 31. During each half-cycle period of one polarity of the current from the supply source 11, current is supplied from the secondary transformer winding 20 to a circuit comprising winding 29, rectifying element 33, resistor 37 and rectifying element 34, all in series. During each half-cycle period of opposite polarity, the current supplied from transformer winding 20 flows through a circuit comprising rectifying element 35, resistor 37, rectifying element 36 and winding 30, all in series. There is thus set up across resistor 37 a unidirectional voltage the amplitude of which depends upon the impedance of windings 29 and 30. There is also provided a rectifying or asymmetrically conducting element 40 in a path connecting the negative terminal of resistor 37 and the negative terminal of resistor 25. When the current supplied to the load is within the normal operating range, the voltage across resistor 37 is less than the voltage across resistor 25. The element 40 is so poled, that, for this condition, the current conduction through the element 40 is negligibly small. The circuit would function satisfactorily under running conditions without the element 40. However, during a starting condition the element 40 prevents the flow of a large surge of current from the rectifier 21 through condenser 38 and through the constant voltage tube 10.

In each of the magnetic circuits 27 and 28 of the saturable reactor 26 of Fig. 1, the magnetomotive forces set up by windings 31 and 32, respectively, are opposed. Also the magnetomotive force due to bias winding 31 is opposed to the magnetomotive force due to winding 29 in one of the magnetic circuits and the magnetomotive force due to the bias winding 31 is opposed to the magnetomotive force due to winding 30 in the other magnetic circuit. As long as the magnetomotive force set up by the load current flowing through the control winding 32 is less than the opposing magnetomotive force set up by the bias winding 31 by an appreciable amount, the voltage across resistor 37 will be substantially less than the voltage across resistor 25 and the rectifying diode 40 will absorb the difference in voltage in its blocking or high resistance direction. When the load current flowing through the control winding 32 increases to an amplitude above the normal operating range of load current with the result that the magnetomotive force due to the control winding 32 is equal to or greater than that due to the bias winding 31, the voltage across resistor 37 will rise rapidly to an amplitude greater than the voltage across resistor 25. The diode rectifier 40 will then pass current in its forward or low resistance direction. Under this condition, any further increase of voltage across resistor 37 will result in an increase of voltage across resistor 25. This increase of voltage across resistor 25 opposes the output voltage of rectifier 21 and thus results in a reduction of the current supplied to the constant voltage tube 10 to such an amplitude that the voltage across the tube 10 is reduced to a value less than the constant voltage across the tube under a normal operating condition. The effect of the reduction of the reference voltage across the tube 10 on the regulator 13 is to partially limit the current supplied to the load 14, as indicated by the drooping portion 17 of the curve of Fig. 6. Under such an overload condition, the voltage across resistor 25 may increase sufficiently to cause the current flow through tube 10 to be reduced substantially to zero.

Figure 7:
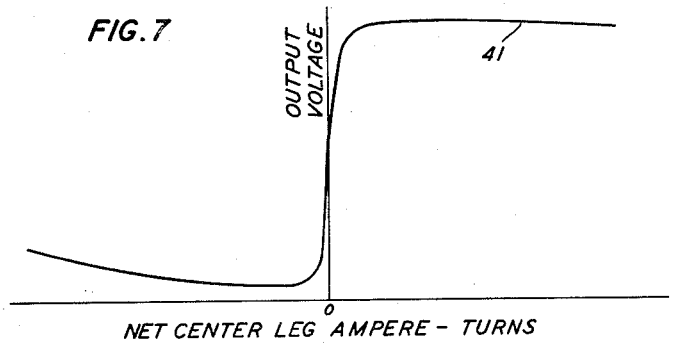

The relationship of the output voltage across resistor 37 and the net center leg ampere turns of the saturable reactor 26, that is, the ampere turns of control winding 32 minus the ampere turns of the bias winding 31, is shown by the curve 41 of Fig. 7. As shown by the curve, in the vicinity of zero net center leg ampere turns, the output voltage rises abruptly in response to an increase of net center leg ampere turns, that is, in response to an increase of current supplied to the control winding 32 if it is assumed that the bias current supplied to winding 31 remains fixed.

The embodiments of the invention shown in Figs. 2, 3, 4 and 8 are modifications of the current supply circuit shown in Fig. 1. The components of Figs. 2, 3, 4 and 8 which correspond to components of Fig. 1 are given the same designations to facilitate comparison of the circuits and to avoid unnecessary duplication of description.

Figure 2:
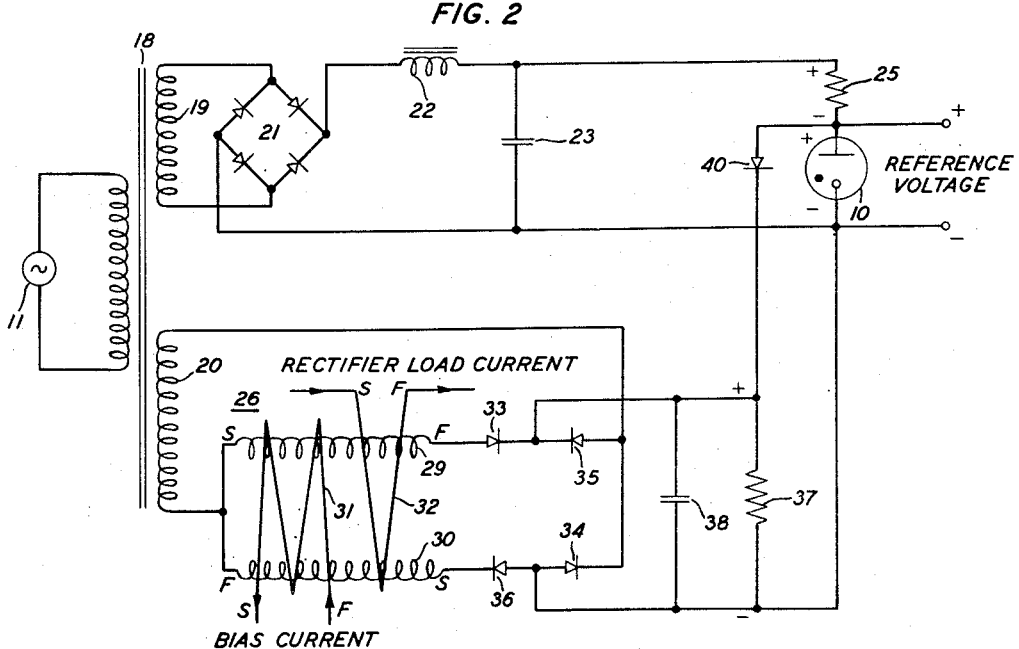

In the circuit of Fig. 2, the direction of the bias current supplied to winding 31 is reversed with respect to the direction of the current flow in winding 31 of Fig. 1 and the direction of the current flow in control winding 32 of Fig. 2 is reversed with respect to the direction of the current flow in winding 32 of Fig. 1. As a result, the magnetomotive force due to the bias winding 31 produces full output voltage across resistor 37 when the current in the control winding 32 is zero. During normal operation, the voltage across resistor 37 is larger than the reference voltage across the constant voltage tube 10 so that the current flow through the rectifying diode 40 is in the blocking or high resistance direction. It will be noted that omission or failure in the blocking of the rectifying diode 40 would in this case result in permanent damage to the tube 10, due to excessive current flowing therethrough. When the load current flowing through the control winding 32 increases to a value approximately equal to or greater than that required to produce a magnetomotive force equal to the magnetomotive force due to the bias current flowing in winding 31, the output voltage across resistor 37 will fall rapidly as can be seen from the characteristic curve of Fig. 7. Under this condition current from rectifier 21 will flow through resistor 25, the rectifying diode 40 in its forward or low resistance direction and through resistor 37, all in series, to increase the voltage drop across the resistor 25 and thus reduce the current supplied to the constant voltage tube 10 sufficiently to cause a reduction of voltage across the tube 10. As in Fig. 1, therefore, the reference voltage is reduced to reduce the load voltage and minimize the rise of load current above the normal operating range of load current.

In Fig. 3, there is provided a transformer 41 having a primary winding 42 and a secondary 43. Current is supplied from the alternating-current supply source 11 through a resistor 44 to the primary winding 42. During half-cycle periods of one polarity of the alternating current, current flows from one end terminal of the secondary winding 43, through winding 29 of the saturable reactor 26, through rectifying element 45 and through a resistor 46 to the other end terminal of transformer secondary winding 43. During half-cycle periods of opposite polarity, current flows from the secondary winding 43 through resistor 46, a rectifying element 65 and winding 30 of the saturable reactor. Alternating current is thus supplied to to the resistor 46. The input terminals of a bridge rectifier 47 are connected across the transformer secondary winding 43. There is connected to the output terminals of rectifier 47 a current path comprising the constant voltage tube 10 and an inductor 48 in series. The reference voltage is obtained between a positive terminal 49 connected to a mid-tap of secondary transformer winding 43 and a negative terminal 50 connected to the inductor 48 at a point intermediate its end terminals.

When the load current supplied to control winding 32 is within a normal operating range, the reference voltage across terminals 49, 50 is substantially constant. The reference voltage is equal to a fraction, one-half, for example, of the voltage across the tube 10. Several circuit arrangements of this type for obtaining a reference voltage less than the voltage across a constant voltage device and substantially free of ripple component are disclosed in my copending application Serial No. 411,467, filed February 19, 1954, allowed January 4, 1955 (now Patent No. 2,713,140, granted July 12, 1955). The magnetomotive force due to the bias winding 31 opposes the magnetomotive forces set up by the currents flowing through windings 29 and 30 in the magnetic circuits formed by cores 27 and 28, respectively. Therefore, little current is supplied to the resistor 46 until the magnetomotive force due to the load current flowing through the control winding 32 becomes approximately equal to the magnetomotive force due to the current supplied to the bias winding 31. The alternating current supplied to resistor 46 then increases rapidly in response to an increase of load current, thereby increasing the load on the secondary winding 43 of transformer 41. This increased loading will cause a larger current to flow through resistor 44 in series with the primary transformer winding 42. The resulting decrease of voltage across the secondary transformer winding to which the input terminals of rectifier 47 are connected will cause the current supplied to the constant voltage tube 10 to decrease sufficiently to lower the amplitude of the reference voltage across terminals 49, 50. Some control of the magnitude and the sharpness of the reduction of the reference voltage may be obtained by adjustment of the resistance value of resistor 46. In many cases it may be desired to reduce the reference voltage to zero in response to an increase of load current to an amplitude above the maximum of the normal operating range of load current.

The circuit of Fig. 4 is similar to the circuit shown in Fig. 3 and corresponding parts are similarly designated in the two figures. In Fig. 3, alternating current is supplied to the resistor 46. Fig. 4 differs from Fig. 3 in that the current supplied to resistor 51 is a pulsating unidirectional current. During half-cycle periods of one polarity of the alternating current supplied from the secondary winding 43 of transformer 41, current flows through a current path comprising winding 29, rectifying element 52, resistor 51 and rectifying element 53, all in series. During half-cycle periods of opposite polarity, the current flows through rectifying element 54, resistor 51, rectifying element 55 and winding 30, all in series. In this embodiment of the invention, the voltage across resistor 51 may be included in a circuit for supplying current to the bias winding 31.

Figure 8:
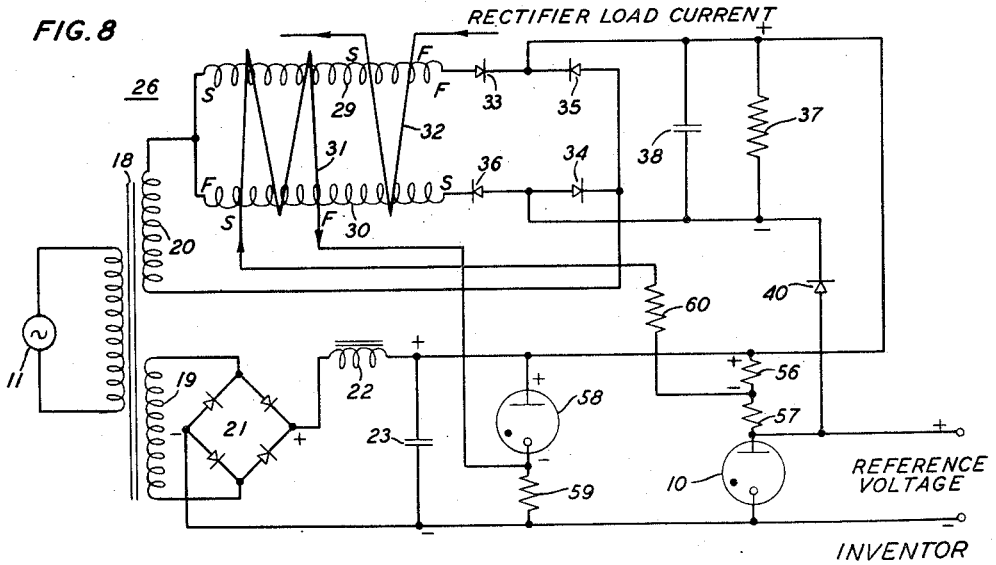

The current supply circuit of Fig. 8 differs from the circuit of Fig. 1 in the following respects. In Fig. 8, current is supplied to constant voltage tube 10 through two series resistors 56 and 57 instead of the single resistor 25 of Fig. 1. There is also provided a current path comprising a constant voltage tube 58 and a resistor 59, in series, to which current is supplied from rectifier 21 through the filter inductor 22, the anode of tube 58 being conductively connected to the common terminal of inductor 22 and condenser 23. Current is supplied to the bias winding 31 in Fig. 8 from the rectifier-filter 21, 22, 23 through a current path comprising resistor 56, resistor 60, bias winding 31 and resistor 59. The voltage impressed upon this current path is equal to the substantially constant voltage across the tube 58 minus the voltage across resistor 56.

In Fig. 8, as in Fig. 1, it is desired that the voltage across resistor 37 should increase to a voltage larger than the voltage across resistors 56 and 57, in series, in response to an increase of load current flowing through control winding 32 to an amplitude above the normal operating load current range. When the line voltage of the source 11 has a certain amplitude, an increase of load current to a predetermined amplitude will cause the voltage across resistor 37 to increase to a value larger than the voltage across resistors 56 and 57 in series. Current is thus caused to flow through the rectifying diode 40, the voltage across resistors 56 and 57 is increased and the voltage across the constant voltage tube 10 is depressed. The assumed increase of load current is thus minimized as described above with reference to Fig. 1. An increase of the line voltage of source 11, for example, will cause the voltage across resistors 56 and 57 to increase. A larger voltage across resistor 37 is therefore required to cause current flow through the rectifying diode 40 so as to depress the reference voltage across the constant voltage tube 10. The required increased voltage across resistor 37 is obtained because of a decrease of current supplied to the bias winding 31 in response to an increase of line voltage. The decreased bias current is due to the increased voltage across resistor 56 in response to an increase of line voltage. Compensation for changing line voltage is thus effected.

In an experimental apparatus according to Fig. 8, the regulating reactor 26 comprised a ⅝-inch stack-up, in each of two cores, of No. 50 D. U. 0.006 inch "Orthonic" laminations supplied by Magnetic Metals Company of Camden, New Jersey. The gating windings 29 and 30 each comprised 2530 turns of No. 28 gauge copper wire, the biasing winding had 1000 turns of No. 33 gauge copper wire and the control winding was a single turn of 0.010 inch by 1.50 inch copper sheet. The alternating voltage across secondary transformer winding 20 was 187 volts, 60 cycles per second, at normal line conditions. The direct voltage across condenser 23 under normal conditions was 165 volts. The inductance of reactor 22 was approximately 4 henries. Condenser 23 had a capacitance of 10 microfarads and the capacitance of condenser 38 was 500 microfarads. The resistance values of resistors 37, 56, 57, 59 and 60 were, respectively, 10,000 ohms, 500 ohms, 2,000 ohms, 2,500 ohms and 6,000 ohms. Regulator tubes 10 and 58 were each of the OC3/VR105 type made by Radio Corporation of America. The rectifying diode 40 was of the 1N65 type manufactured by General Electric Company. Measurements were made at three values of line voltage and over a range of current flow through the control winding 32, of the current flowing through the reference tube 10 and the reference voltage across the tube 10. The following data were obtained:

| Input line voltage: | | | | | | |
|---|---|---|---|---|---|---|
| 103.5 | Control winding amperes. | 0 | 13.2 | 13.45 | 13.6 | 14.3 |
| | Reference tube, milliamperes. | 14.0 | 15.5 | 10.0 | 0 | 0 |
| | Reference voltage. | 105.9 | 106.0 | 106.0 | 100.0 | 50.0 |
| 115 | Control winding amperes. | 0 | 13.2 | 13.35 | 13.55 | 14.3 |
| | Reference tube milliamperes. | 19.5 | 17.0 | 10.00 | 0 | 0 |
| | Reference voltage. | 105.9 | 106.0 | 106.0 | 100.0 | 50.0 |
| 126.5 | Control winding amperes. | 0 | 13.2 | 13.25 | 13.55 | 14.3 |
| | Reference tube milliamperes. | 24.0 | 14.0 | 10.00 | 0 | 0 |
| | Reference voltage. | 106.0 | 106.0 | 106.0 | 100.0 | 50.0 |

From the above data it is apparent that the reference voltage across the tube 10 is depressed quite sharply in the neighborhood of 13.6 amperes load current flowing through the control winding 32. A characteristic relationship between load voltage and load current of the type shown in Fig. 6 is thus obtained, the maximum load current in the normal operating range being approximately 13.5 amperes. Control of the cut-off value of current is obtained by varying the resistance value of resistor 60. With the 1000 to 1 ratio of the turns of bias winding 31 to the turns of control winding 32, an increase of the bias current of one milliampere would result in an increase of the cut-off value of current by one ampere. It is apparent from the data that the reference voltage is independent of line voltage changes under both normal and cut-off or overload conditions.

Figure 9:
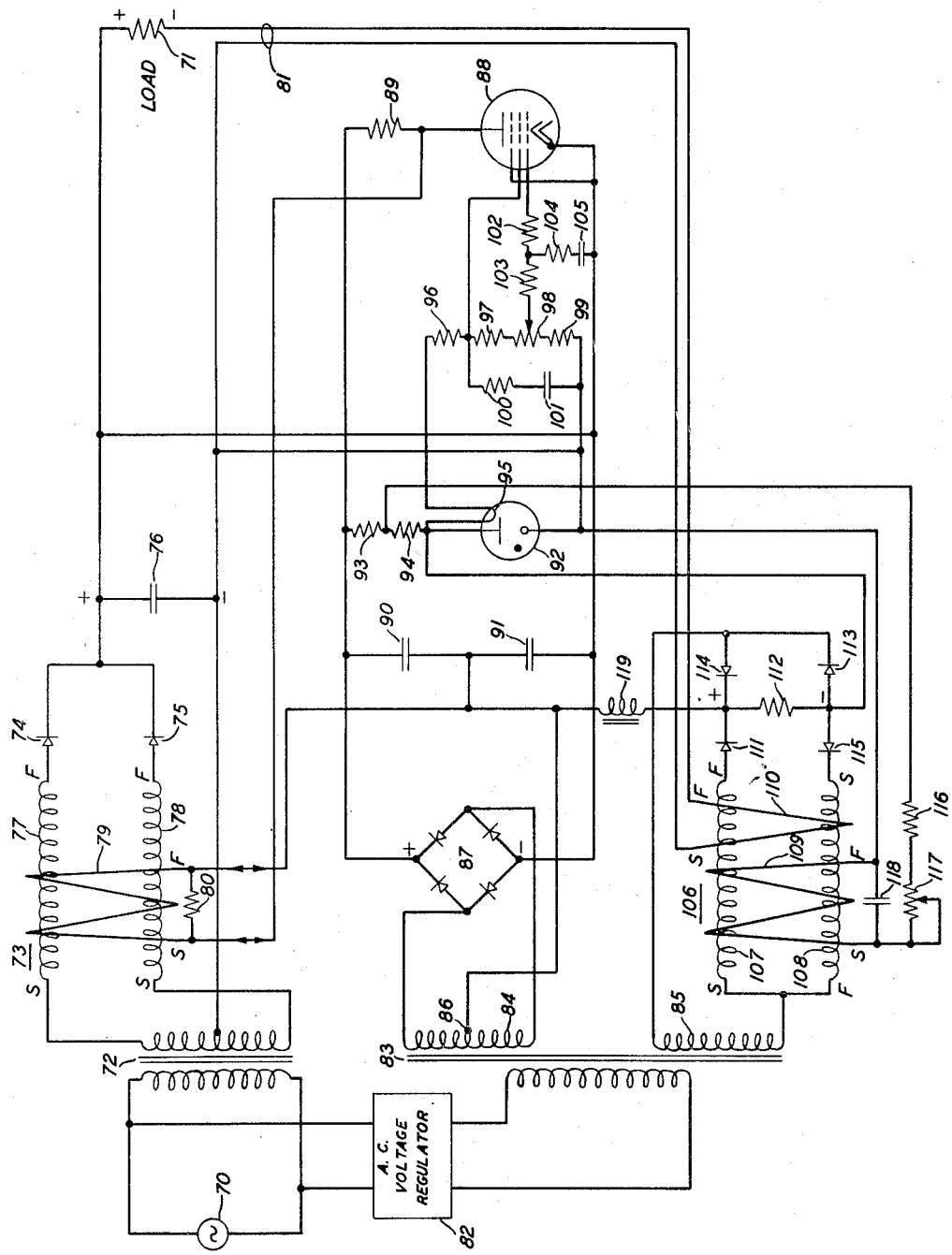

A 6.6 volt, 15-ampere controlled rectifier embodying the invention is depicted in Fig. 9. Regulated, full wave rectified current is supplied from an alternating-current supply source 70 to a load 71 by means comprising a transformer 72, a saturable reactor 73, rectifier elements 74 and 75 and a filtering condenser 76 shunted across the load circuit. The saturable reactor 73 comprises two gate or impedance windings 77 and 78 and a control winding 79 across which is connected a resistor 80. During half-cycle periods of one polarity of the alternating current, current flows from the upper terminal of the secondary of transformer 72 through winding 77 and rectifying diode 74 to the positive load terminal and, from the negative terminal of the load, through a control winding connected to leads 81, to which reference will be made below, to a center tap of the transformer secondary winding. During half-cycle periods of opposite polarity, current flows from the lower terminal of transformer secondary winding through winding 78, rectifying element 75, the load 71 and through the control winding connected to leads 81 to the center tap of the transformer winding.

Current is also supplied from the alternating-current source 70 through a suitable alternating-current voltage regulator 82 to the primary of a transformer 83 having two secondary windings 84 and 85, the transformer winding 84 having a mid tap 86. There is provided a bridge rectifier 87 having a pair of input terminals connected to the end terminals of transformer winding 84. There is provided a space current amplifier tube 88 having its cathode connected to the negative output terminal of rectifier 87. The positive output terminal of rectifier 87 is connected through a resistor 89 to the anode of tube 88. Filter condensers 90 and 91, in series, are connected across the output terminals of rectifier 87. There is provided a cold cathode, gas filled, constant voltage tube 92. Energizing current is supplied to tube 92 through a circuit which may be traced from the positive terminal of rectifier 87, through resistors 93 and 94, in series, to the anode of tube 92, from the cathode of tube 92 to the negative terminal of condenser 76 and from the positive terminal of condenser 76 to the negative output terminal of rectifier 87, the voltage across condenser 76 being substantially equal to the load voltage. There is connected across the tube 92, through a connector 95 in the base of tube 92, a voltage divider comprising, in series, resistors 96 and 97, a potentiometer 98 and a resistor 99. A current path connecting a common terminal of resistors 96 and 97 to the cathode of tube 92 comprises a resistor 100 and a condenser 101 in series. The suppressor grid of tube 88 is connected to its cathode. The screen grid of tube 88 is connected to the common terminal of resistors 96 and 97. The control grid of tube 88 is connected through resistors 102 and 103, in series, to the adjustable tap of potentiometer 98. The common terminal of resistors 102 and 103 is connected through a current path comprising a resistor 104 and condenser 105, in series, to the cathode of tube 88. The S terminal of control winding 79 of saturable reactor 73 is connected to the anode of tube 88 and the F terminal of winding 79 is connected to the common terminal of condensers 90 and 91 and to the mid terminal 86 of transformer winding 84.

Considering the operation of the circuit as thus far described, it will be seen that, at a predetermined load voltage, the potential of the anode of tube 88 may be equal to the potential of the mid terminal 86 of the transformer winding 84. For this condition zero current will flow through the control winding 79. An increase of load voltage above the predetermined voltage will make the control grid of tube 88 relatively more negative with respect to its cathode to make the potential of its anode relatively more positive. Current will then flow into the S terminal and out of the F terminal of control winding 79 to cause the reactance of gate windings 77 and 78 to increase. The increase of load voltage is thus minimized. If the load voltage should decrease with respect to the predetermined voltage, the control grid of tube 88 will become relatively less negative with respect to its cathode to make the anode of tube 88 less positive than the potential of the mid-terminal of transformer winding 84. Current will then flow into the F terminal and out of the S terminal of control winding 79 to cause the reactance of gate windings 77 and 78 to decrease, thus minimizing the decrease of load voltage.

There is provided a saturable reactor 106 comprising gate windings 107 and 108, a bias winding 109 and a control winding 110. During half-cycle periods of one polarity of the alternating current from source 70, the current from secondary winding 85 is supplied to a circuit comprising gate winding 107, a rectifying element 111, resistor 112 and a rectifying element 113, all in series. During half-cycle periods of opposite polarity, the current is supplied to a circuit comprising in series, a rectifying element 114, resistor 112, a rectifying element 115 and gate winding 108. Bias current is supplied to winding 109 through a circuit starting from the positive terminal of rectifier 87, through resistor 93, through a resistor 116 and a variable resistor 117 to the S terminal of the bias winding, from the F terminal of the bias winding to the negative terminal of condenser 76 and from the positive terminal of condenser 76 to the negative terminal of rectifier 87. A filtering condenser 118 is connected across the bias winding. The load current is supplied through conductors 81 to the control winding 110. The positive terminal of resistor 112 is connected through an inductor 119 to the center tap 86 of transformer winding 84. The negative terminal of resistor 112 is connected to the terminal of resistor 94 going to the anode of tube 92. With this connection, one-half the voltage of rectifier 87 is in series aiding relationship with the voltage across resistor 112 and considerably less output voltage across resistor 112 is required. The 4-henry choke coil 119 is provided in series with resistor 112 in the current path connecting the mid-point of transformer 84 to the anode of tube 92 to prevent disturbance of the voltage across tube 92 prior to cut off by the ripple component across condensers 90 and 91. The ripple component across the resistor 112 is also absorbed in this way and thus prevented from passing through the tube 92.

When the load current rises to an amplitude above a normal operating range, the voltage across resistor 112 increases to cause a flow of current in a circuit which may be traced from the positive terminal of resistor 112 through choke coil 119, transformer winding 84, rectifying elements of rectifier 87 and resistors 93 and 94 to the negative terminal of resistor 112. The voltage across resistors 93 and 94 is thus increased to cause a reduction of current flowing through tube 92 and a reduction of the voltage across the tube. The control grid of amplifier tube 88 is thus made relatively more negative with respect to its cathode to cause an increase of current from S to F in the control winding 79. The increase of load current above the normal operating range is thus minimized.

The load to which current is supplied from rectifier 74, 75 may be a storage battery or a resistance load, alternatively. Of course a resistance load may also be connected across the battery to which current is supplied from the rectifier 74, 75. When the battery is being charged, the current supplied to control winding 110 is a pulsating current and, unless the magnetomotive force produced is smoothed, the value of cut-off load current will be considerably less with a battery load than it would be with a resistance load. The capacitor 118 across the biasing winding will minimize this effect by providing a path for circulating current in the bias winding which produces a magnetomotive force opposing the variational component of the magnetomotive force in the control winding.

The resistor-capacitor combination comprises resistors 103 and 104 and condenser 105 acts as a lag circuit to stabilize the rectifier under normal operating conditions. The combination comprises resistors 96 and 100 and condenser 101 acts as a lag circuit to stabilize the rectifier under overload cut-off conditions.

In a test made on the circuit of Fig. 9, under a normal operating condition the voltage across each half of the secondary winding of transformer 72 was 11.4 volts, the voltage across each half of the secondary transformer winding 84 was 117.5 volts and the voltage across the secondary transformer winding 85 was 187 volts. The amplifier tube 88 is the 6AC7 type and the tube 92 is the OC3/VR105 type. Each core of the saturable reactor 73 is a 2 9/16 inch stack-up of No. 50 D. U. "Orthonic" laminations. Windings 77 and 78 are each 35 turns of 0.085 inch by 0.185 inch copper sheet. Winding 79 had 500 turns of No. 26 gauge copper wire. Each core of reactor 106 is a 3/4 inch stack-up of No. 37 D. U. "Orthonic" laminations. Windings 107 and 108 are each 2772 turns of No. 32 copper wire. The bias winding 109 has 1000 turns of No. 32 copper wire. The control winding 110 has a single turn of 0.032 inch by 1.25 inch copper sheet. The capacitances of condensers 76, 90, 91, 101, 105 and 118 are, respectively, 28,000 microfarads, 4 microfarads, 4 microfarads, 800 microfarads, 10 microfarads and 4 microfarads. The resistance values of resistors 80, 89, 93, 94, 96, 97, 99, 100, 102, 103, 104, 112, 116 and 117 are, respectively, 2,500 ohms, 15,000 ohms, 2,500 ohms, 2,500 ohms, 300 ohms, 35,000 ohms, 1,360 ohms, 80 ohms, 20,000 ohms, 50,000 ohms, 10,000 ohms, 5,000 ohms, 7,500 ohms and 3,000 ohms. The resistance of potentiometer 98 is 1,000 ohms.

The following data were obtained in testing the circuit of Fig. 9 with different values of line voltage of the supply source 70 with both battery loading and resistance loading. The data shows the output voltage across the load 71 and the current through the reference tube 92 for various values of output current through the load 71.

| Input line voltage | | Battery loading | | | | | |
|---|---|---|---|---|---|---|---|
| 103.5 | Output, amperes | 0.64 | 6.38 | 11.0 | 15.5 | 16.4 | 18.3 |
| | Output, voltage | 6.72 | 6.68 | 6.61 | 6.58 | 6.43 | 5.19 |
| | Reference tube, milliamperes | 16.6 | 19.1 | 19.8 | 14.8 | 0 | 18.75 |
| 115 | Output, amperes | 1.10 | 6.95 | 11.6 | 16.35 | 17.35 | 5.10 |
| | Output, voltage | 6.79 | 6.70 | 6.63 | 6.60 | 6.48 | |
| | Reference tube, milliamperes | 17.0 | 19.7 | 20.9 | 5.0 | 0 | 0 |
| 126.5 | Output, amperes | 1.35 | 7.20 | 11.8 | 16.8 | 18.0 | 19.10 |
| | Output, voltage | 6.81 | 6.73 | 6.68 | 6.61 | 6.50 | 5.00 |
| | Reference tube, milliamperes | 17.3 | 20.0 | 21.8 | 7.0 | 0 | 0 |

| Input line voltage | | Resistance loading | | | | | |
|---|---|---|---|---|---|---|---|
| 103.5 | Output, amperes | 1.02 | 6.04 | 10.8 | 15.75 | 16.55 | 19.0 |
| | Output, voltage | 6.70 | 6.66 | 6.60 | 6.52 | 5.78 | 3.69 |
| | Reference tube, milliamperes | 17.0 | 19.1 | 20.1 | 1.0 | 0 | 0 |
| 115 | Output, amperes | 1.10 | 6.15 | 10.8 | 15.55 | 16.95 | 19.4 |
| | Output, voltage | 6.77 | 6.69 | 6.63 | 6.61 | 5.90 | 3.78 |
| | Reference tube, milliamperes | 17.2 | 19.6 | 21.2 | 17.5 | 0 | 0 |
| 126.5 | Output, amperes | 1.15 | 6.17 | 10.8 | 15.6 | 17.2 | 19.8 |
| | Output, voltage | 6.80 | 6.73 | 6.69 | 6.62 | 5.98 | 3.87 |
| | Reference tube, milliamperes | 17.4 | 19.9 | 21.8 | 19.7 | 0 | 0 |

Figure 10:
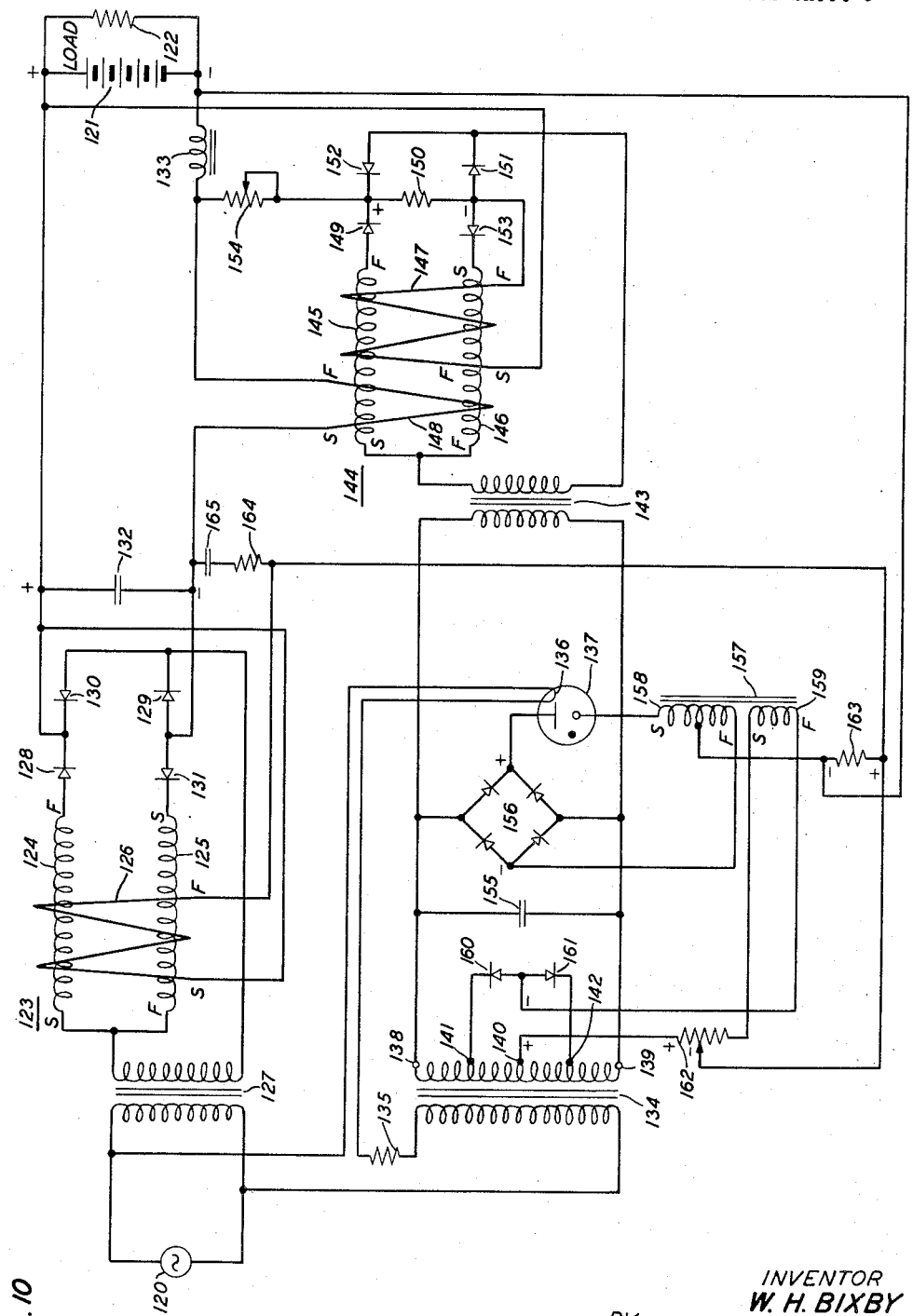

In Fig. 10 is shown a circuit for supplying rectified current from a supply source 120 to a load circuit comprising a battery 121 and a load 122 connected across it. There is provided a saturable reactor 123 having two gate or impedance windings 124 and 125 and a control winding 126. There are also provided a transformer 127 having its primary connected to the supply source 120, a rectifier comprising rectifying elements 128, 129, 130 and 131, and a ripple filter comprising a shunt condenser 132 and a series inductive reactor 133. During half-cycle periods of one polarity of the alternating current, current is supplied from the secondary winding of transformer 127 to a circuit comprising winding 124, rectifying element 128, condenser 132 and rectifying element 129. During half-cycle periods of opposite polarity, the current is supplied through rectifying element 130, condenser 132, rectifying element 131 and winding 125. The positively charged terminal of condenser 132 is directly connected to the positive load terminal. The negatively charged terminal of condenser 132 is connected through the control winding of a saturable reactor which will be described and through inductor 133 to the negative load terminal.

There is provided a second transformer 134 to the primary of which current is supplied from the supply source 120 through a circuit comprising a resistor 135 and conductor 136 in the base of a constant voltage tube 137. The secondary winding of transformer 134 has end terminals 138 and 139, a mid-terminal 140 and terminals 141 and 142 equally spaced electrically from the mid-terminal. The end terminals 138 and 139 are connected, respectively, to the end terminals of the primary winding of a third transformer 143 having a 1 to 1 turns ratio. A second saturable reactor 144 is provided having gate windings 145 and 146, a bias winding 147 and a control winding 148. During half-cycle periods of one polarity of the alternating current from source 120, current is supplied from the secondary of transformer 143 to a current path comprising winding 145, a rectifying element 149, a resistor 150 and a rectifying element 151. During half-cycle periods of opposite polarity, current is supplied from the secondary of transformer 143 to a circuit comprising a rectifying element 152, resistor 150, a rectifying element 153 and winding 146. The circuit for energizing the bias winding 147 may be traced from the positive load terminal to the S terminal of winding 147, from the F terminal of winding 147 to the negative terminal of resistor 150 and from the positive terminal of resistor 150 through variable resistor 154 and reactor 133 to the negative load terminal. The control winding 148 is connected in the load circuit between the negative terminal of condenser 132 and the inductive reactor 133.

A condenser 155 and the input terminals of a bridge rectifier 156 are each connected across the secondary of transformer 134. There is provided a reactor 157 having windings 158 and 159. The energizing circuit for the constant voltage tube 137 may be traced from the positive terminal of rectifier 156 to the anode of tube 137, from the cathode of tube 137 to the S terminal of winding 158 and from the F terminal of winding 158 to the negative terminal of rectifier 156. There are provided a rectifier comprising rectifying diodes 160 and 161 and a potentiometer 162. The positive terminal of this rectifier is the mid-tap 140 of the secondary of transformer 134. The negative rectifier terminal is the common terminal of the rectifying elements 160 and 161. A circuit may be traced from the positive rectifier terminal 140 through potentiometer 162 and through winding 159 to the negative rectifier terminal. The reference voltage is set up across a resistor 163. This reference voltage is equal to the voltage across the constant voltage tube 137 minus the voltage between the positive terminal of rectifier 156 and the mid-tap 140 of the secondary transformer winding minus the voltage between the mid-tap 140 of the transformer winding and the variable tap of potentiometer 162. This portion of the circuit is designed in accordance with the disclosure of my copending application, supra, so as to provide a reference voltage less than the constant voltage across the tube 137 and having a negligibly small ripple component. The energizing circuit for the control winding 126 of saturable reactor 123 may be traced from the positive load terminal to the S terminal of winding 126 from the F terminal of winding 126 to the positive terminal of the reference voltage across resistor 163 and from the negative terminal of the reference voltage across resistor 163 to the negative load terminal. A resistor 164 and a condenser 165, in series are provided in a current path connecting a common terminal of winding 126 and resistor 163 to the negative terminal of condenser 132.

The voltage impressed across the control winding 126 is therefore substantially equal to the load voltage minus the reference voltage across the resistor 163. For a load current within a normal operating range, the reference voltage remains substantially constant. Therefore, as the load voltage increases, for example, the energization of winding 126 is increased to cause the impedance of the gate windings 124 and 125 to increase. In this manner changes of load voltage are minimized when the load current is within a normal operating range. When the load exceeds the normal load current range, the current supplied to resistor 150 from the secondary winding of transformer 143 increases abruptly to cause the alternating current supplied from the source 120 through resistor 135 to increase. The voltage across each winding of transformer 134 thus decreases to cause the current supplied from the rectifier 156 to tube 137 and the reference voltage across resistor 163 to decrease. The resulting increase of current supplied to the control winding 126 causes the voltage across the load to decrease, thereby limiting the increase of load current.

It will be noted that the load voltage and the voltage across resistor 150 are in aiding relationship in the energizing circuit for the bias winding 147. During an overload condition, the decrease of load voltage tending to reduce the bias current is offset by the increase of voltage across resistor 150. The resulting bias current aids in holding the load current to a nearly constant amplitude when the load current exceeds the normal operating range.

In some cases it may be preferable to dispense with the isolating transformer 143. This may be accomplished by providing an auxiliary bias winding wound about the two core portions 27 and 28 (see Fig. 5), connecting the auxiliary biasing winding through a current limiting resistor to the terminals of resistor 150 and by connecting the main bias winding 147 to the load terminals.

In tests made on the circuit of Fig. 10, the secondary voltage of transformer 127 was 83.9 volts, the voltage across the secondary of transformer 134 was 140 volts and the voltage between the taps 141 and 142 was 26.4 volts. Each core of saturable reactor 123 is a 2⅜ inch stack-up of E–I 175 laminations of No. 29 gauge, grain oriented silicon steel. The windings 124 and 125 are each 112 turns of No. 13 copper wire. Winding 126 is 1500 turns of No. 26 copper wire. Each core of saturable reactor 144 is a ⅝ inch stack-up of No. 50 D. U. Orthonic laminations. Windings 145 and 146 are each 2530 turns of No. 28 copper wire. Bias winding 147 has 1000 turns of No. 33 copper wire and control winding 148 has 4 turns of No. 14 copper wire. Each half of the winding 158 of reactor 157 has 1647 turns and winding 159 of reactor 157 has 310 turns. The inductance of reactor 133 is 0.1 henry. Tube 137 is the OC3/VR105 type. The capacitance of condensers 132, 155, and 165 are respectively 10,000 microfarads, 1 microfarad and 1,500 microfarads. The potentiometer 162 has a resistance of 100 ohms and variable resistor 154 has a maximum resistance of 3,000 ohms. The resistance of resistor 135 is approximately 335 ohms. Resistors 163 and 164 have resistance values of 1,500 ohms and 75 ohms, respectively.

The following data obtained on the circuit of Fig. 10 shows the output voltage across the load and the current supplied to the reference tube 137 for different values of output current supplied from rectifiers 128, 129, 130, 131 to the load circuit and different values of input line voltage from the source 120.

ing a predetermined maximum amplitude, and means responsive to load current in excess of said maximum amplitude for increasing the flow of current through said resistor to cause a reduction of said load voltage.

2. The combination with means for supplying to a load which may vary current having a predetermined normal maximum amplitude, of a constant voltage device, a resistor, means for supplying through said resistor to said constant voltage device current within a normal operating range including a predetermined minimum amplitude for setting up a substantially constant voltage across said constant voltage device, means including said constant voltage device for regulating the current supplied to said load, and means responsive to load current in excess of said maximum amplitude for reducing the current supplied to said constant voltage device to an amplitude less than said predetermined minimum amplitude.

3. In combination, a constant voltage device, a first resistor, means for supplying from a current supply source through said first resistor to said constant voltage device a unidirectional current having a predetermined minimum amplitude to cause a substantially constant voltage to be set up across said constant voltage device, a second resistor, means for supplying unidirectional current to said second resistor for setting up across said second resistor a voltage which may vary over a range including voltages larger than and voltages smaller than the voltage across said first resistor, an asymmetrically conducting element, and a circuit comprising said first and second resistors and said asymmetrically conducting element all in series for causing an increase of current through said first resistor in response to an increase of voltage across said second resistor to an amplitude larger than the voltage across said first resistor.

4. In combination, a first resistor, a constant voltage device, means for supplying to a first current path comprising said first resistor and said constant voltage device in series direct current having a predetermined minimum current value for causing a substantially constant voltage to be set up across said constant voltage device, a saturable reactor having a first and a second winding, a second resistor, means for supplying unidirectional current to a second current path comprising said first winding and said second resistor in series to set up across said second resistor a voltage within a normal voltage range having predetermined minimum and maximum voltages, means for energizing said second winding to control the current in said second current path and means responsive to a voltage across said second resistor outside of said normal voltage range for increasing the current through said first resistor and reducing the current through said constant voltage device below said minimum current value.

5. In combination, a constant voltage device, a first

| Input line voltage: | | | | | | | | | |
|---|---|---|---|---|---|---|---|---|---|
| 105 | Output, amps | 3.71 | 4.19 | 4.30 | 4.30 | 4.30 | 4.29 | 4.22 | 4.06 |
| | Output volt | 47.6 | 47.6 | 47.2 | 46.7 | 46.1 | 45.0 | 43.3 | 37.8 |
| | Reference tube, ma | 10.1 | 3.9 | 1.0 | 0.7 | 0.7 | 0 | 0 | 0 |
| 115 | Output, amps | 4.10 | 4.20 | 4.61 | 4.65 | 4.65 | 4.65 | 4.60 | 4.45 |
| | Output volt | 47.9 | 47.9 | 47.3 | 47.1 | 46.2 | 45.2 | 43.4 | 38.2 |
| | Reference tube, ma | 14.1 | 9.8 | 2.1 | 1.0 | 0.8 | 0 | 0 | 0 |
| 125 | Output, amps | 4.42 | 4.61 | 4.96 | 4.98 | 4.99 | 4.99 | 4.97 | 5.02 |
| | Output volt | 48.2 | 48.2 | 47.9 | 47.6 | 46.4 | 45.9 | 43.6 | 39.2 |
| | Reference tube, ma | 16.1 | 12.0 | 3.0 | 1.8 | 0.8 | 0 | 0 | 0 |

What is claimed is:

1. The combination with means for supplying current to a load, of a constant voltage device, a resistor, means for supplying unidirectional current through said resistor to said constant voltage device to set up across said device a voltage which normally remains substantially constant irrespective of voltage changes of said supply source, means comprising said constant voltage device for minimizing changes of load voltage when the current supplied to said load is within an operating range including resistor, means for supplying from a first current supply source through said first resistor to said constant voltage device a unidirectional current having a predetermined minimum amplitude to cause a substantially constant voltage to be set up across said constant voltage device, a second resistor, means for supplying unidirectional current from a second current supply source to said second resistor for setting up across said second resistor a voltage which may vary over a range including voltages larger than and smaller than said substantially constant voltage, an asymmetrically conducting device, and a current path comprising said first and second resistors and said asymmetrically conducting device all in series connected to said first current supply source for causing a reduction of the voltage across said constant voltage device in response to a reduction of voltage across said second resistor to a value below said substantially constant voltage.

6. In combinaion, means for supplying to a load current which may vary over a range including a predetermined normal maximum amplitude, a constant voltage device, means for setting up a reference voltage having a substantially constant value under a normal operating condition comprising said constant voltage device and means for supplying to said device unidirectional current normally having a predetermined minimum amplitude, means responsive jointly to said reference voltage and said load voltage for regulating the voltage across said load, and means responsive to load current in excess of said maximum amplitude for causing the current supplied to said constant voltage device to decrease to an amplitude less than said predetermined minimum amplitude to reduce said reference voltage to a voltage less than said substantially constant value.

7. In combination, a rectifier having a pair of input terminals and a pair of output terminals, means having resistance for supplying current from an alternating-current supply source to said rectifier input terminals, a constant voltage device, a current path comprising said constant voltage device connected to said rectifier output terminals, means comprising said constant voltage device for setting up a reference voltage which is substantially constant over an operating range of current including a predetermined minimum current supplied to said constant voltage device, a shunt current path connected across said rectifier input terminals, and means for reducing the impedance of said shunt current path to cause the current supplied to said constant voltage device to be reduced below said predetermined minimum current, thereby reducing said reference voltage below said substantially constant voltage.

8. In combination, a constant voltage device, a first resistor, a first rectifier, means for supplying current from said first rectifier to said first resistor and said constant voltage device in series, a second rectifier, a second resistor, a saturable reactor having an impedance winding and a control winding, means for supplying rectified current from said second rectifier through said impedance winding and said second resistor in series, means for supplying current to said control winding for controlling the current supplied to said second resistor, a third rectifier and a circuit comprising said first and second resistors, and said third rectifier, all in series.

9. In combination, a constant voltage device, a first resistor, a first rectifier, means for supplying current from said first rectifier to said first resistor and said constant voltage device in series, a second rectifier, a second resistor, a saturable reactor having an impedance winding and a control winding, means for supplying rectified current from said second rectifier through said impedance winding and said second resistor in series, means for supplying current to said control winding for controlling the impedance of said impedance winding, a third rectifier and a circuit comprising said first rectifier, said first and second resistors and said third rectifier, all in series.

10. In combination, a rectifier having a pair of input terminals and a pair of output terminals, means having impedance for supplying alternating current from a supply source to said input terminals, a constant voltage device, an impedance device, a circuit comprising said constant voltage device and said impedance device in series connected to said output terminals, a saturable reactor having an impedance winding and a control winding, a shunt current path comprising said impedance winding connected across said input terminals and means for supplying to said control winding current for controlling the impedance of said impedance winding.

11. In combination, a first rectifier having a pair of input terminals and a pair of output terminals, means having resistance for supplying alternating current from a supply source to said input terminals, a constant voltage device, an impedance device, a circuit comprising said constant voltage device and said impedance device connected to said output terminals, a saturable reactor having an impedance winding and a control winding, a resistor, a second rectifier, a shunt current path connected to said input terminals comprising in series said impedance winding, said resistor and said second rectifier and means for supplying current to said control winding for controlling the current in said shunt current path.

12. In combination, means comprising a first rectifier for supplying rectified current to a load circuit comprising a load, a first saturable reactor having a first control winding which may be energized for controlling the impedance of said first impedance winding, means comprising said first impedance winding for controlling the current supplied to said load, a second rectifying means comprising a bridge rectifier having a pair of input terminals to which alternating current is supplied from a transformer winding and a pair of output terminals, said transformer winding having a mid-terminal, a constant voltage device, resistance means, means for impressing the sum of the load voltage and the output voltage of said bridge rectifier upon a current path comprising said resistance means and said constant voltage device in series, a second saturable reactor comprising a second impedance winding, a bias winding and a second control winding, a first resistor, means for supplying rectified current through said second impedance winding and said first resistor in series, means for supplying the load current to said control winding, means responsive jointly to a current supplied to said bias winding and to the load current supplied to said control winding for controlling the impedance of said second impedance winding, thereby controlling the voltage across said first resistor, a circuit which may be traced from the positive terminal of said bridge rectifier through said resistance means to the negative terminal of said first resistor and from the positive terminal of said first resistor to the mid-terminal of said transformer winding, a space current device having a plurality of electrodes comprising an anode, a cathode and a control electrode, a second resistor, means for supplying current from said bridge rectifier through said second resistor to the space current path of said space current device, said second resistor and an electrode of said space current device having a common terminal, means for impressing upon the control electrode-cathode path of said space current device a voltage equal to the difference of a voltage proportional to the load voltage and a portion at least of the voltage across said constant voltage device, means for connecting one terminal of said first control winding to said common terminal, and means for connecting the other terminal of said first control winding to said mid-terminal of said transformer winding.

13. In combination, means comprising a first rectifier for supplying rectified current to a load circuit comprising a load, a first saturable reactor having a first impedance winding and a first control winding which may be energized for controlling the impedance of said first impedance winding, means comprising said first impedance winding for controlling the current supplied to said load, a second rectifying means comprising a bridge rectifier having a pair of input terminals and a pair of output terminals, a first resistor, a transformer having a primary and a secondary, means for connecting said primary and said first resistor in series to a source of alternating current, said secondary having a pair of end terminals, a mid-terminal and a fourth and a fifth terminal which are equally spaced electrically with respect to said mid-terminal, means for connecting said input terminals of said bridge rectifier to said end terminals, respectively, of said secondary, an inductor having a first and a second winding, said first winding having a tap intermediate its end terminals, a constant voltage device, means for connecting said constant voltage device and said first inductor winding in series to said output terminals of said bridge rectifier, a third rectifier connected to said fourth and fifth terminals of said transformer secondary having a positive and a negative output terminal, said positive output terminal being the mid-terminal of said transformer secondary, means comprising a second resistor for supplying current from said third rectifier to the second winding of said inductor, a third resistor, a circuit which may be traced from the positive output terminal of said third rectifier through a portion at least of said second resistor and through said third resistor to said intermediate terminal of said first inductor winding, means for impressing upon said first control winding a voltage equal to the difference of said load voltage and the voltage across said third resistor, a second saturable reactor having a second impedance winding, a bias winding and a second control winding, means for supplying said load current to said second control winding, a fourth rectifier, a fourth resistor, a current path effectively in shunt with said input terminals of said bridge rectifier comprising in series said second impedance winding, said fourth rectifier and said fourth resistor and means for impressing across said bias winding a voltage substantially equal to the sum of said load voltage and the voltage across said fourth resistor.

References Cited in the file of this patent

UNITED STATES PATENTS

| | | |
|---|---|---|
| 2,356,269 | Potter | Aug. 22, 1944 |
| 2,579,235 | Kerns | Dec. 18, 1951 |
| 2,683,853 | Logan | July 13, 1954 |